Feb. 13, 1923.
J. W. BURTON.
ANTISKID DEVICE FOR VEHICLES.
FILED NOV. 21, 1921.
1,445,485.
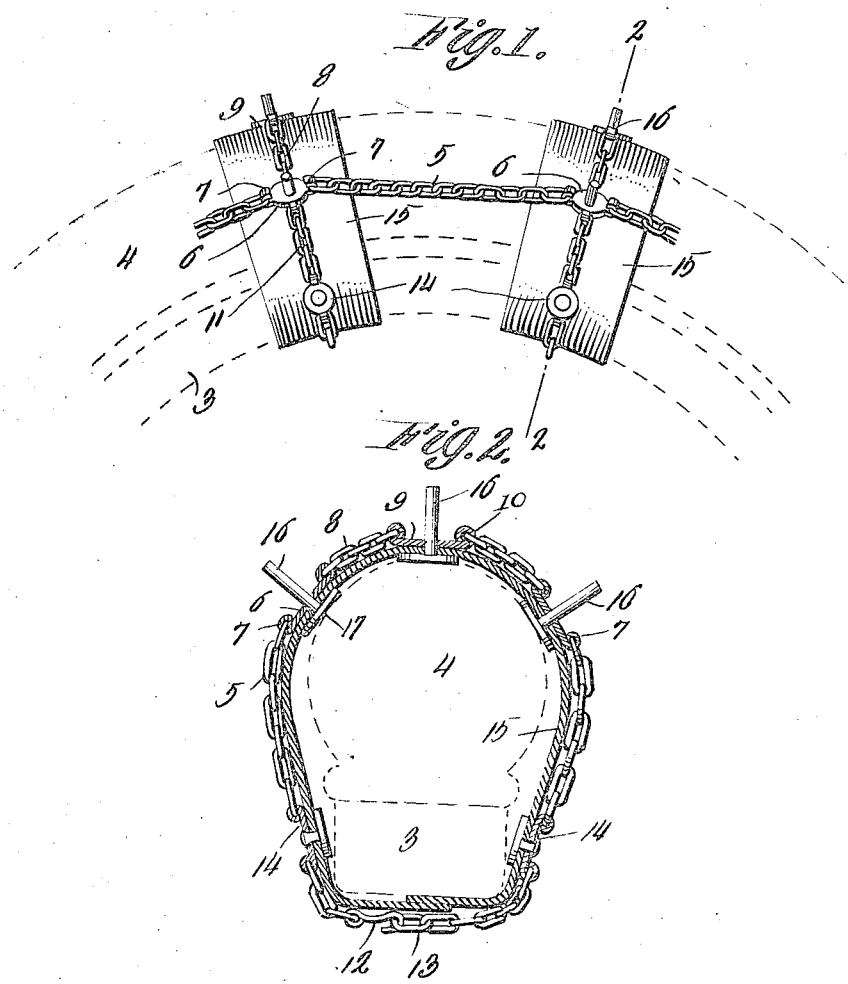
WITNESSES
JOHN W. BURTON, Inventor
Attorney Patented Feb. 13, 1923.

1,445,485

UNITED STATES PATENT OFFICE.

JOHN W. BURTON, OF WOODWARD, IOWA.

ANTISKID DEVICE FOR VEHICLES.

Application filed November 21, 1921. Serial No. 516,765.

*To all whom it may concern:*

Be it known that I, JOHN W. BURTON, a citizen of the United States, residing at Woodward, in the county of Dallas and State of Iowa, have invented certain new and useful Improvements in Antiskid Devices for Vehicles, of which the following is a specification.

This invention relates to new and useful improvements in anti-skid devices for motor vehicles and has for its object to provide protective means embodied therein for preventing wear and tear upon the tire and felly ordinarily caused by such devices.

Another important object of the invention is to provide improved means for attaching the protective means to the anti-skid device, said means also serving as anti-skid or traction devices.

Other objects and advantages of the invention will become apparent during the course of the following description.

In the accompanying drawings forming a part of the description and wherein like numerals are employed to designate like parts throughout the several views, Figure 1 is a side elevation of a portion of the anti-skid device as applied to a motor vehicle wheel, and Figure 2 is an enlarged transverse section of the same taken on the line 2—2 of Figure 1.

Referring now more particularly to the drawing wherein for the purpose of illustration is shown the preferred embodiment of my invention, the numeral 3 designates the felly of an automobile wheel upon which is mounted the ordinary pneumatic tire 4, as shown in dotted lines.

The anti-skid device consists of a pair of attaching members 5 which assume the form of flexible elements such as chains and extend circumferentially around the tire to which the device is applied. These attaching members are arranged in spaced parallel relationship to each other and when applied to a tire, are arranged upon opposite sides thereof. The ends of these attaching members may be connected together for fastening the device upon a tire in any suitable manner.

Interposed in each attaching member 5 at spaced intervals therein, are link members 6 which preferably consist of small disks each having its periphery equipped with oppositely disposed peripheral hooks 7 which have their free ends extended outwardly as seen. A pair of these oppositely disposed hooks 7 are adapted for engagement with a pair of the links in the attaching member 5 whereby the link members may be interposed therein. Each disk 6 is equipped with a central aperture for a purpose which will presently be described.

A plurality of gripping members 8 are provided for the device and are adapted to extend between the two attaching members 5 and transversely thereof whereby opposite ends of each gripping member 8 can be attached to a pair of oppositely disposed link members 6 in the two attaching members 5 by means of hooks 7. A plate 9 of approximately the same construction as the link members 6 is interposed in each gripping member 8, but is only provided with a pair of oppositely disposed hooks or eyelets 10 for the reception of a pair of links of the gripping member. These plates 9 are provided with central apertures for the same purpose as those in the link members 6.

As additional means for securing the anti-skid device to a tire and for preventing the same from moving circumferentially therearound, I fasten the free ends of flexible fastening devices 11 to the unemployed hooks 7 of oppositely disposed link members 6 in the two attaching members 5. Each fastening member 11 is divided between its ends as best seen in Figure 2 and one of these free ends is provided with a hook 12 while the other is equipped with a loop 13 whereby the fastening devices may be secured around the felly 3. A plate 14 is interposed in each side of the fastening member 11 and is apertured for a purpose which will later be described.

In order to prevent the anti-skid device from imposing excessive wear upon the tire and also upon the felly of the wheel, I provide protective members for each gripping and fastening member. The protective means consists of a plurality of pliable strips of material 15, one being fastened to the inside of each gripping member and each fastening member 11. The strips are of sufficient length to completely encircle portions of the tire and felly so that the free ends of the strips may be brought together in overlapping relation upon the inner face of the felly. Each protective strip 15 which is preferably of leather, is provided with a plurality of apertures to aline with those in its respective gripping members 8 and fastening member 11. Several studs 16 each having a head 17 at its inner end, are passed from the inner faces of the protective strips so that the studs extend through the alining openings in the strips and the plates 6, 9 and 14 to fasten the strips to the underside of the gripping and fastening members 8 and 11. The studs 16 which extend through the plates 14 of the fastening devices are shipped off and upset against the outer faces of the plate 14 whereby they are securely retained upon the outer faces of the protective strips. However, the studs 16 which extend through the plates 6 and 9 are extended outwardly a substantial distance to form traction means for the device. The plates are secured to these studs by welding or otherwise so that they will not slip off of the studs.

From the foregoing description, it will be obvious that an anti-slipping device has been provided which is comparatively inexpensive to manufacture and which will provide an excellent traction means for vehicle wheels inasmuch as the studs 16 form additional anti-slipping devices beside the chains constituting the gripping members 8. Due to the protective strips 15, the anti-slipping device will cause absolutely no wear or damage to the tire and felly to which it is applied.

The foregoing description and accompanying drawing have reference to what might be considered to be the preferred or approved form of my invention. I desire it to be understood that I may make changes in the construction, combination and arrangement of parts, material, dimensions, etc., as may prove expedient and fall within the scope of the appended claims.

Having thus fully described my invention what I claim as new and desire to secure by Letters Patent is:

An anti-skid device for vehicle tires comprising a plurality of equidistantly spaced flexible strips adapted to extend transversely about a tire and rim, transverse antiskid chains secured to said strips, means for permitting the inter-connection of the chain terminals together for holding the strips in place on a tire and rim, connecting plates interposed in said chains, gripping studs extended through said strips and plates and circumferentially extending anti-skid chains secured to said plates.

In testimony whereof I affix my signature in presence of two witnesses.

JOHN W. BURTON.

Witnesses:
 A. R. OLSON,
 G. A. CARREL.